C. OLSON.
JUMPING JACK TOY.
APPLICATION FILED MAR. 4, 1920.

1,354,577.

Patented Oct. 5, 1920.

INVENTOR:
Carl Olson,
BY his ATTORNEY:
A. M. Carlsen.

UNITED STATES PATENT OFFICE.

CARL OLSON, OF RACINE, WISCONSIN.

JUMPING-JACK TOY.

1,354,577.  Specification of Letters Patent.  Patented Oct. 5, 1920.

Application filed March 4, 1920. Serial No. 363,295.

*To all whom it may concern:*

Be it known that I, CARL OLSON, a citizen of the United States, residing at Racine, in the county of Racine and State of Wisconsin, have invented a new and useful Jumping-Jack Toy, of which the following is a specification.

My invention relates to toys, and the object is to enlarge and improve upon jumping jacks and make them mechanically more perfect and capable of performing a greater number of feats and hence making them more interesting for children.

Figure 1:
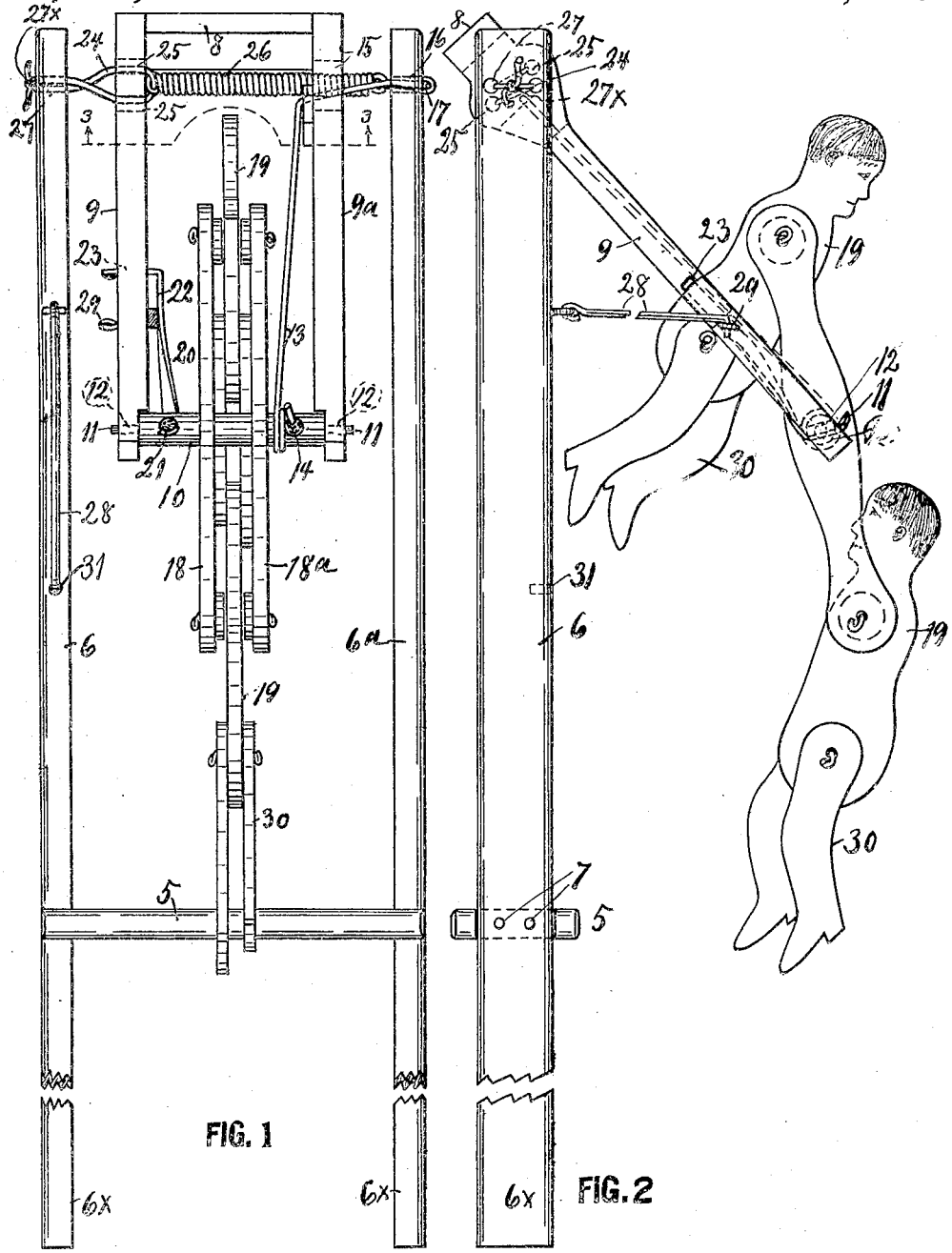
Figure 2:
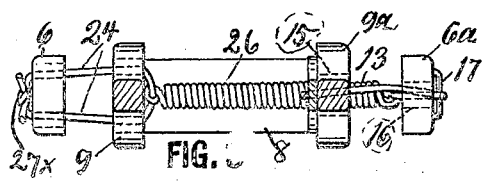

In the accompanying drawing:

Figure 1 is a front view of my improved jumping jacks showing jacks in same position as in Fig. 2 but with supporting hook released. Fig. 2 is a side view showing trapeze adjusted in a set position, by means of the said supporting hook. Fig. 3 is a top view of Fig. 1, showing the upper portion of the trapeze in section on a line 3—3, but in inverted position.

Referring to the drawings, by reference numerals, the main frame consists of a cross bar 5 and upright side bars 6 and $6^a$ which have holes in their sides and are fastened to bar 5 by pegs, screws or nails 7, of smaller diameter than the holes, thus allowing of a somewhat loose or joint like action.

The trapeze frame is U-shaped, consisting of a top cross member 8 secured to side members or arms 9 and $9^a$. In the ends of said arms are journaled at 12 the ends 11 of the roller 10.

A cord 13 is fastened to and wound around the roller. It is also passed through a hole 15 in the member $9^a$ and through another hole 16 in the bar $6^a$ and tied at 17. It serves to turn the roller 10 by means of a pulling motion which takes place, when the upright bar $6^a$ is pulled inwardly at its lower end by pinching the legs $6^x$ toward each other.

The beams or arms 18 and $18^a$ are rigidly secured to the roller 10 and hence turn over when it turns, thus carrying the jacks 19—19, which are trunnioned between the arms, around with them. A rubber cord 20, or other suitable means (see Fig. 4) is fastened in a hole 21, in the roller 10 and is placed over a block 22 and fastened at 23 to the arm 9. Said resilient element 20 yields to the pulling on the cord 13 and then returns the arms 18—$18^a$ around in reverse direction when the cord is slackened.

A cord 24 is passed through holes 25 in the side member 9 and through the end loop of a spring 26 and through holes 27 in the side bar 6 and is tied together outside at $27^x$.

When the trapeze is in idle position this cord 24 remains twisted or crossed as shown in Fig. 1, but when the bars $6^x$ are pulled toward each other, the natural tendency for the cord 24 to straighten as shown at 24 in Fig. 3, turns the trapeze around into inverted position and throws it to either side thereof.

The spring 26 pulls the bars 6 and $6^a$ into parallel position when the toy is idle.

The simplest action of the toy occurs when the trapeze is locked by hook 28, which is fastened to the side bar 6 and hooked into a screw eye 29 in the arm 9. The pull on the cord 13 and the reacting pull of the element 20 makes it possible to turn the jacks around in either direction. The jacks can turn upside down and to various positions, on account of the backward and forward movement of the beam arms 18—$18^a$ to which they are pivoted. The limbs 30, being also pivoted, swing in a realistic manner.

When the hook 28 is released and the point of it stuck into the hole 31 it is out of the way and the complete action of the toy can be obtained. The pressure and release at the lower ends $6^x$, of bars 6 and $6^a$, throws the trapeze around backward or forward while at the same time the jacks are turned around in various directions by the roller 10.

What I claim is:

1. In a toy of the kind described, a frame composed of two parallel operating bars and an intermediate cross-bar hingedly attached with its ends to the adjacent sides of the parallel bars, a coil spring connecting the upper ends of the operating bars, a U-shaped trapeze suspended on said coil spring, a rotatable roller journaled with its ends in the arms of the U-shaped trapeze, a beam fixed at its middle on said roller and a human figure pivotally attached to each end of the beam, said coil spring having at one end two spaced cords connecting it to the main frame, a cord guided in the trapeze near the spring and having one end fixed to the adjacent one of the main frame bars and the other end partly wound about the roller to rotate it in one direction, and means for automatically rotating it in the reverse direction.

2. The structure specified in claim 1, said automatic means consisting of an elastic strand partly wound on the roller and having one end secured to the frame of the trapeze.

3. The structure specified in claim 2, and means for locking the trapeze to the main frame when so desired.

4. The structure specified in claim 3, said human figures having pivotally attached lower limbs and their bodies pivoted to the ends of the beam.

In testimony whereof I affix my signature.

CARL OLSON.